Reissued Apr. 17, 1951

Re. 23,358

UNITED STATES PATENT OFFICE 23,358

PROCESS FOR PRODUCING INCREASED REFRIGERATION

Winston Harrison Reed, Radford, Va., and William Alvin Pennington, Fayetteville, N. Y., assignors to Carrier Corporation, Syracuse, N. Y., a corporation of Delaware No Drawing. Original No. 2,479,259, dated August 16, 1949, Serial No. 668,762, May 10, 1946. Application for reissue June 15, 1950, Serial No. 168,388

8 Claims. (Cl. 62—178)

Matter enclosed in heavy brackets [ ] appears in the original patent but forms no part of this reissue specification; matter printed in italics indicates the additions made by reissue.

This invention relates to refrigerant mixtures and to a method of using the same.

Refrigeration equipment is designed to provide a specific refrigeration capacity when used with a specific refrigerant at specific inlet and discharge conditions and operated at a prescribed number of revolutions per minute. One form of refrigeration apparatus extensively employed in the industry is designed for use with dichlorodifluoromethane as a refrigerant and for operation directly connected at 1750 R. P. M. on 60 cycle current. If such equipment be operated on 50 cycle current, for example, the capacity is considerably reduced since it then operates at perhaps 1450 R. P. M. Under such conditions it is desirable that a refrigerant be provided which would serve to increase the capacity approximately to the amount at which the equipment is designed to operate under normal conditions. This is a difficult problem. All refrigerants known either have a suction pressure lower or higher than dichlorodifluoromethane. A refrigerant with lower pressure would give a lower capacity even at the same compressor speed when substituted in a compressor designed for use with dichlorodifluoromethane; at a slower speed the capacity of the compressor would be even further reduced. Recognized refrigerants with suction pressures higher than dichlorodifluoromethane are undesirable for use in compressors specifically designed for use with dichlorodifluoromethane since they provide so great an increase in capacity as to overload the motor designed for the system using dichlorodifluoromethane.

A refrigerant adapted for substitution in such compressors should have thermodynamic properties coupled with an increase in pressure over that of dichlorodifluoromethane which would result in an increased capacity sufficient to compensate for a reduction in speed of the compressor; that is, the refrigerant should permit approximately the same capacity to be obtained when the compressor is operating at a reduced speed as is obtained when the compressor is operating at its normal speed using dichlorodifluoromethane as a refrigerant.

For some uses, a refrigerant possessing properties intermediate the properties possessed by dichlorodifluoromethane and monochlorodifluoromethane is highly desirable. Such a refrigerant provides intermediate performance when substituted in a refrigeration system designed for use with dichlorodifluoromethane as a refrigerant permitting the same motor to be operated at the same speed to provide lower temperatures or permitting the same motor to be operated at a lower speed to obtain the same temperature; in addition, a refrigerant providing intermediate performance permits a larger motor to be used to operate the compressor of a system designed for use with dichlorodifluoromethane as a refrigerant to obtain an increase in capacity.

The chief object of this invention is to provide a refrigerant mixture which behaves essentially as a single refrigerant and which obviates the disadvantages discussed above.

An object of this invention is to provide a refrigerant mixture adapted for use in apparatus designed specifically for the chief component of the mixture which enables the apparatus to provide substantially the same refrigeration capacity even when operated at a substantial decrease in the number of revolutions per minute.

A further object is to provide a novel azeotropic mixture for use as a refrigerant.

A still further object is to provide a novel mixture of refrigerants capable of use where conditions intermediate to those provided by dichlorodifluoromethane and monochlorodifluoromethane are required.

A still further object is to provide a refrigerant capable of substitution in a refrigeration system designed for dichlorodifluoromethane as a refrigerant to provide lower temperatures with the same motor operating at the same speed or to provide the same temperature with the same motor operating at a lower speed.

A still further object is to provide a refrigerant having somewhat higher capacity than dichlorodifluoromethane under the same conditions such that at a temperature as that used for product cooling the capacity of the system will be increased as compared with that capacity obtained using dichlorodifluoromethane permitting the horsepower of the compressor to be approximately the same as for the same compressor running at the same speed, but with a higher inlet (suction) temperature as for instance corresponding to the refrigerant temperatures required for purposes of comfort air conditioning.

A still further object is to provide a refrigerant prepared by the addition of a second refrigerant to dichlorodifluoromethane, such refrigerant having capacity and horsepower requirements related to those of dichlorodifluoromethane so as to form a fairly close ratio such that by using alternatively either such refrigerant or dichlorodifluoromethane it is possible to load fully a series of motors of different capacities driving the same compressor at various suction and discharge conditions and at constant speed.

A still further object is to provide a refrigerant for use in refrigerating apparatus which consists of an azeotropic mixture. Other objects of our invention will be readily perceived from the following description.

We have found a mixture of dichlorodifluoromethane and unsym. difluoroethane to be particularly advantageous for the purposes described above. This specific mixture is adapted for use with equipment designed for the use of dichlorodifluoromethane as a refrigerant when it is necessary to operate such equipment at a considerable reduction in speed and provides a material increase in refrigeration capacity at such reduction in speed.

It also permits equipment designed for use with dichlorodifluoromethane as a refrigerant to be operated with the same motor at the same speed to provide lower suction temperatures and permits a larger motor to be used if desired to obtain a substantial increase in capacity at the same suction temperatures.

Dichlorodifluoromethane possesses a boiling point of [−21.6° F.] *−21.7° F.* at atmospheric pressure while unsym. difluoroethane possesses a boiling point of [−11.5° F.] *−12°* F. at atmospheric pressure ([14.69] *14.70* pounds per square inch). Dichlorodifluoromethane at a temperature of 32° provides a pressure of about 45 pounds per square inch absolute which may be regarded as normal or 100%. Unsym. difluoroethane at a temperature of 32° possesses a pressure of about 38.5 pounds per square inch absolute. According to Raoult's law, any mixture of such materials should possess a pressure between the two extremes. Contrary to this law, however, the addition of unsym. difluoroethane to dichlorodifluoromethane increases the pressure over a wide range to provide a highly desirable increase in capacity. Such increase in capacity amounts to about 18% depending upon the quantity of unsym. difluoroethane mixed with dichlorodifluoromethane; our tests indicate that the increase in capacity amounts to approximately 17.8%. Our invention is directed to any mixture of such materials providing an increase in capacity over the capacity provided by dichlorodifluoromethane alone under the same conditions of use. Our invention includes any mixture of unsym. difluoroethane and dichlorodifluoromethane capable of providing an increase in capacity up to about 18% in refrigerating apparatus designed for use with dichlorodifluoromethane when the apparatus is operated at a given speed over the capacity possessed by the equipment when dichlorodifluoromethane alone is used at the same speed.

An azeotropic mixture of dichlorodifluoromethane and unsym. difluoroethane provides the greatest increase in capacity when employed in equipment designed for use with dichlorodifluoromethane as a refrigerant. When dichlorodifluoromethane and unsym. difluoroethane are mixed in an amount comprising approximately [76] *74* parts by weight of dichlorodifluoromethane and approximately [24] *26* parts by weight of unsym. difluoroethane an azeotropic mixture is formed having a constant boiling point of approximately [40° F.] *32° F.* at an absolute pressure of approximately [60] *52.7* pounds per square inch. Our tests indicate that the amount of unsym. difluoroethane contained in the azeotrope is about [23.8] *26.2* parts by weight. *This mixture possesses a boiling point of about −28° F. at 14.7 p. s. i. a.*

The use of such azeotropic mixture in refrigerating equipment designed for dichlorodifluoromethane permits decreased temperatures to be obtained while operating the compressor with the same motor at the same speed. Likewise, the use of such azeotropic mixture greatly increases the capacity of the equipment. For example, a compressor designed for use with dichlorodifluoromethane and for operation on 60 cycle current at 1750 R. P. M. possesses 100% capacity. Substitution of the azeotropic mixture of our invention in place of dichlorodifluoromethane increases the capacity about 18%. If the compressor designed for use with dichlorodifluoromethane and for operation on 60 cycle current at 1750 R. P. M. is operated on 50 cycle current, the speed of the compressor is reduced to approximately 1450 R. P. M. with an accompanying reduction in capacity of about 17%. The substitution of the azeotropic mixture of our invention in place of dichlorodifluoromethane under such circumstances provides an increase in capacity of about 18% and permits the recovery of the lost capacity caused by the reduction in speed. Such increase in capacity obtained by means of the substituted refrigerant compares favorably with the capacity of the equipment when the compressor is operated at its normal speed with the refrigerant for which the equipment is designed. Such equipment may be designed for use at a condensing temperature of approximately 105° F. and at an evaporating temperature of approximately 40° F. In operation the mixture may be condensed at a condensing temperature of approximately 105° F., then transferred to the evaporator or heat exchanger and evaporated at a temperature of approximately 40° F. to provide the required heat transfer.

While we have found that the specific azeotropic mixture recited above provides the greatest increase in capacity under the conditions described it will be understood that any mixture of dichlorodifluoromethane and unsym. difluoroethane which provides greater pressure serves to increase the capacity of the compressor over the capacity provided by dichlorodifluoromethane.

It will be appreciated, of course, that the respective amounts of unsym. difluoroethane and dichlorodifluoromethane in the azeotrope vary in accordance with temperature and pressure; that is, the amount of unsym. difluoroethane contained in the azeotrope changes gradually as the temperature for example increases. The amount of unsym. difluoroethane contained in the azeotrope recited above is based on [60] 52.7 pounds per square inch absolute pressure and a boiling point of approximately [40° F.] 32° F.

This invention provides a novel refrigerant for use in refrigerating equipment. The refrigerant mixture so provided may be used in equipment specifically designed for use with the chief component of the mixture and greatly increases the capacity of the equipment when so used.

This is particularly desirable when it is necessary to operate the equipment at lower speeds which, of course, would reduce the capacity when used with the refrigerant for which it is specifically designed. Our invention provides a refrigerant possessing properties intermediate the properties possessed by dichlorodifluoromethane and monochlorodifluoromethane. The refrigerant so provided may be substituted in a system designed for use with dichlorodifluoromethane as a refrigerant to provide lower temperatures while retaining the same motor operating at the same speed for actuating the compressor of the system. If desired, an increase in capacity may be obtained by using a larger motor to operate the compressor. The novel refrigerant so provided effectively fills the gap in available refrigerants between dichlorodifluoromethane and monochlorodifluoromethane and serves as a ready and adequate replacement therefor under various conditions.

The term "unsym. difluoroethane" is used herein to denote unsymmetrical difluoroethane (*ethylidene fluoride*).

While we have described a preferred embodiment of our invention, it will be understood our invention is not limited thereto since it may be otherwise embodied within the scope of the following claims.

We claim:

1. The process of producing increased refrigeration effect in a refrigeration cycle designed for using dichlorodifluoromethane consisting in evaporating an azeotropic mixture of dichlorodifluoromethane and unsymmetrical difluoroethane, compressing and condensing the evaporated azeotropic mixture to produce refrigeration effect substantially eighteen per cent greater than that produced by the use of dichlorodifluoromethane alone in such cycle.

2. The process of transferring heat in refrigeration cycle consisting in evaporating an azeotropic mixture *which at a temperature of 32° F. consists* of substantially [seventy-six] *74* parts by weight of dichlorodifluoromethane and substanitally [twenty-four] *26* parts by weight of unsymmetrical difluoroethane, and then compressing and condensing the azeotropic mixture.

*3. A method of producing refrigeration effect consisting of introducing into a refrigeration system a refrigerant consisting of dichlorodifluoromethane having a boiling point of −21.7° at a certain pressure and ethylidene fluoride having a boiling point of −12° F. at said pressure, the refrigerant having a boiling point of −28.3° F. at said pressure, evaporating the refrigerant, the concentration of the refrigerant remaining the same as it is vaporized with each of said components remaining in the same ratio with respect to the other, and then successively compressing and condensing the refrigerant, the components in the refrigerant remaining in the same ratio during the compression and condensation stages.*

*4. A method of increasing the capacity of a refrigeration system consisting in evaporating within the system a refrigerant consisting of a mixture of dichlorodifluoroethane and ethylidene fluoride having a higher pressure at a prescribed temperature than the pressure at said temperature of either of two components forming the refrigerant, and compressing and condensing the refrigerant in a refrigeration cycle in said system.*

*5. In a refrigerating system, a refrigerant comprising a vapor and a liquid in equilibrium with one another, the composition of said vapor being the same as the composition of said liquid, said refrigerant consisting of the azeotrope of dichlorodifluoromethane and ethylidene fluoride having a pressure at a predetermined temperature greater than the pressure of either component at such temperature.*

*6. In a refrigeration system employing a positive displacement compressor, a refrigerant consisting of a mixture of dichlorodifluoromethane and ethylidene fluoride having a pressure at a predetermined temperature greater than the pressure of either component at such temperature, said refrigerant producing at approximately five-sixths of the speed and displacement of said compressor refrigerating effect substantially equivalent to that produced with dichlorodifluoromethane when the compressor is operated at full speed under the same suction and discharge conditions in the system.*

*7. A refrigerant for use in compression refrigeration systems consisting of a mixture of dichlorodifluoromethane and ethylidene fluoride having a pressure at a predetermined temperature greater than the pressure of either component at such temperature.*

*8. The process of producing refrigeration which comprises evaporating with the absorption of heat in a refrigeration cycle a mixture of dichlorodifluoromethane and ethylidene fluoride having azeotropic properties and having a pressure at a predetermined temperature greater than the pressure of either component at such temperature.*

WINSTON HARRISON REED.
WILLIAM ALVIN PENNINGTON.

REFERENCES CITED

The following references are of record in the file of this patent or the original patent:

UNITED STATES PATENTS

| Number | Name | Date |
|---|---|---|
| 2,191,196 | Fleischer | Feb. 20, 1940 |
| 2,255,584 | Hubacker | Sept. 9, 1941 |